US008657099B2

(12) United States Patent
Bianchini

(10) Patent No.: US 8,657,099 B2
(45) Date of Patent: Feb. 25, 2014

(54) TWISTING CONVEYING DEVICE FOR PREFORMS

(75) Inventor: Cedric Bianchini, Octeville-sur-Mer (FR)

(73) Assignee: Sidel Participations, Octeville sur Mer (FR)

( * ) Notice: Subject to any disclaimer, the term of this patent is extended or adjusted under 35 U.S.C. 154(b) by 504 days.

(21) Appl. No.: 12/988,256

(22) PCT Filed: Apr. 16, 2009

(86) PCT No.: PCT/FR2009/050702
§ 371 (c)(1),
(2), (4) Date: Oct. 15, 2010

(87) PCT Pub. No.: WO2009/138626
PCT Pub. Date: Nov. 19, 2009

(65) Prior Publication Data
US 2011/0031089 A1 Feb. 10, 2011

(30) Foreign Application Priority Data

Apr. 18, 2008 (FR) ...................................... 08 02146

(51) Int. Cl.
*B65G 47/44* (2006.01)
*B65G 47/248* (2006.01)
(52) U.S. Cl.
CPC .................................... *B65G 47/248* (2013.01)
USPC ........................................................ 198/417
(58) Field of Classification Search
USPC .............................. 198/389, 416, 417; 193/46
See application file for complete search history.

(56) References Cited

U.S. PATENT DOCUMENTS 1,190,235 A * 7/1916 Ayers ............................. 198/417
3,105,526 A * 10/1963 Hurtig ........................... 141/171
(Continued)

FOREIGN PATENT DOCUMENTS

DE 601 16 064 T2 8/2006
DE 10 2005 048 126 A1 4/2007
(Continued)

OTHER PUBLICATIONS

International Search Report for PCT/FR2009/050702, dated Nov. 16, 2009.
(Continued)

*Primary Examiner* — William R Harp
(74) *Attorney, Agent, or Firm* — Sughrue Mion, PLLC

(57) ABSTRACT

The device includes several rails supported by a frame (17) which form a kind of tunnel for the end of the preforms, on the neck (21) side. The tunnel is twisted and the two rails (12) and (13) which act as a guidance under the neck have a separation which is constant between the entrance (4) and the exit (5) of the tunnel in order to convey diverse and varying preforms. One of the rails, the rail (12), is straight and the other rail, the rail (13), is curved, this curved rail (13) having a profile created in accordance with the type of preform to be conveyed. The straight rail (12) corresponds to the edge of a guide (15) in the form of a simple flat which is fixed to the frame (17), and the curved rail (13) also corresponds to the edge of a guide (16) in the form of a simple flat which is also fixed suitably to the said frame (17).

12 Claims, 1 Drawing Sheet

(56) References Cited

U.S. PATENT DOCUMENTS

| | | | |
|---|---|---|---|
| 3,837,452 A * | 9/1974 | Schuricht | 193/12 |
| 4,469,229 A * | 9/1984 | Cronan | 209/544 |
| 4,480,382 A * | 11/1984 | Haigh et al. | 29/786 |
| 5,097,943 A * | 3/1992 | Kawasaki et al. | 198/836.1 |
| 5,186,307 A | 2/1993 | Doudement et al. | |
| 5,609,237 A * | 3/1997 | Lenhart | 198/406 |
| 6,189,701 B1 | 2/2001 | Winter | |
| 6,889,823 B2 | 5/2005 | Delaporte et al. | |
| 7,861,852 B2 | 1/2011 | Klaiber et al. | |
| 7,891,480 B2 | 2/2011 | Lemaistre et al. | |
| 8,074,782 B2 | 12/2011 | Charpentier et al. | |
| 2005/0118057 A1* | 6/2005 | Quetel et al. | 422/24 |
| 2007/0108018 A1 | 5/2007 | Charpentier | |
| 2009/0095598 A1 | 4/2009 | Stoiber et al. | |
| 2009/0211880 A1 | 8/2009 | Klaiber et al. | |

FOREIGN PATENT DOCUMENTS

| | | |
|---|---|---|
| EP | 0 511 048 A1 | 10/1992 |
| EP | 2 213 594 A1 | 8/2010 |
| EP | 2 048 097 B1 | 5/2011 |
| WO | 2006/084831 A1 | 8/2006 |
| WO | 2007/028627 A2 | 3/2007 |
| WO | 2011/029949 A1 | 3/2011 |

OTHER PUBLICATIONS

Opposition Notification with Opposition Statement for EP Application No. 09 745945.7, dated Apr. 5, 2012.

* cited by examiner

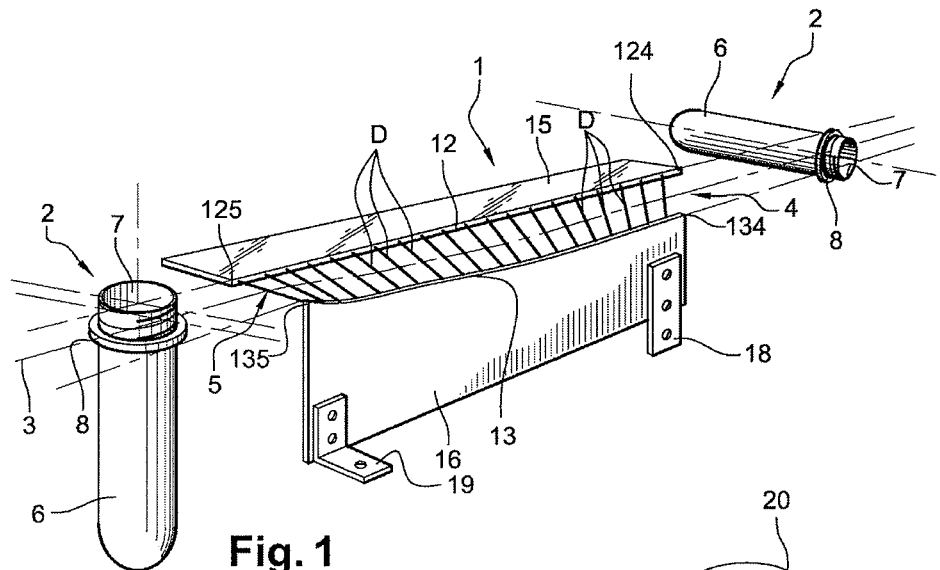
Fig. 1
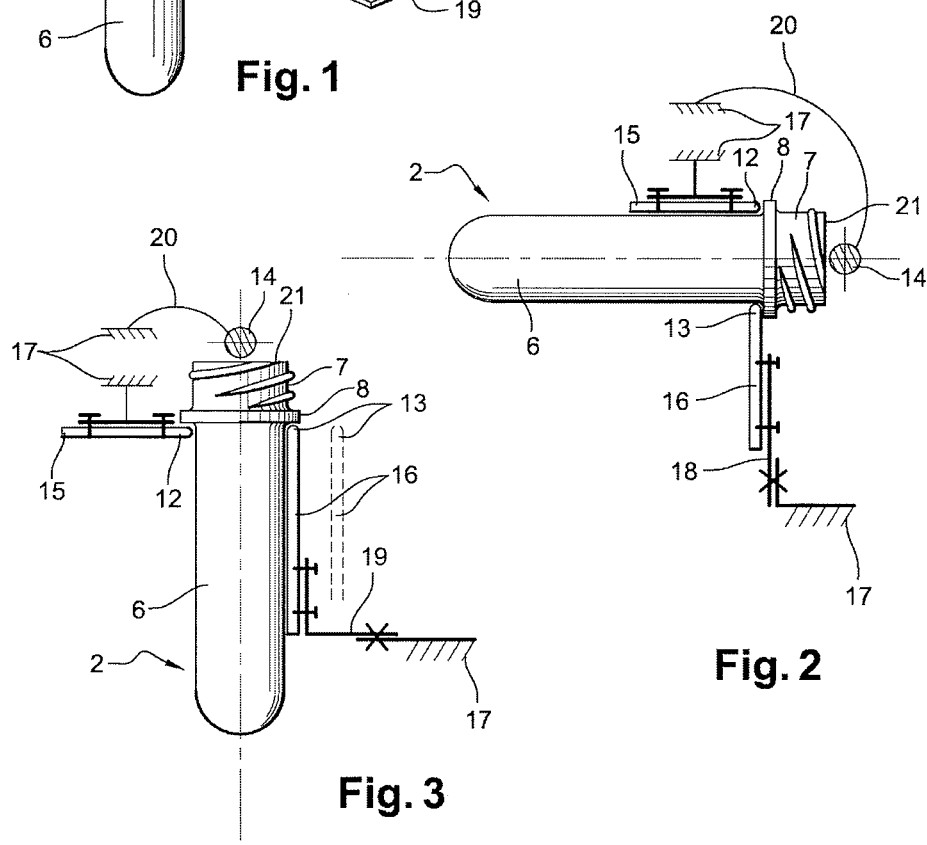
Fig. 2
Fig. 3

TWISTING CONVEYING DEVICE FOR PREFORMS

FIELD OF THE INVENTION

This invention relates to a device for conveying products of the preform type, as, for example, bottles, flasks, etc.

DESCRIPTION OF THE PRIOR ART

Document WO2007028627 shows a conveyor device which makes it possible to modify the orientation of the preforms by means of a kind of twist, in order to switch them from a horizontal position to a vertical position, for example.

This type of twist is carried out by means of guides which are formed in the shape of propellers; the spacing between the guidance edges must be constant in order to obtain a perfect fluidity in the flow of preforms between the entrance and the exit of this special conveyor device.

The type of twist is relatively delicate to carry out due to the complexity of the forms and of the extreme precision which is required in order to carry out a guidance without incidents.

In addition, this type of twist does not easily lend itself to changes of the formats of the preforms; the entire conveyor device must be changed.

SUMMARY OF THE INVENTION

The conveyor device for products of the preform type, according to the invention, forms a kind of tunnel wherein are guides and imprisoned the end of said preforms, on the neck side, said tunnel is comprised of several rails supported by a frame and formed in order to create a twist that extends from the entrance to the exit of said tunnel, and in particular:
  a curved rail which cooperates with the end of the preforms, on the neck side, in order to retain them prisoner;
  two rails which provide a guidance under the neck and of which one is straight and of which the other is curved, formed with a profile which makes it possible to establish a separation which is constant between the entrance and the exit of said twist.

According to another arrangement of the invention, the guidance rail of the preforms corresponds to the edge of a guide in the form of a simple flat which is fixed to the frame.

Still according to the invention, the curved rail corresponds to the edge of a guide in the form of a simple flat, also, which is fixed to the frame, said edge is formed with a curvature which is such that its separation with the edge of the straight rail is constant.

According to another arrangement of the invention, the guide provided with the straight rail is arranged horizontally between the entrance and the exit of the twist.

Still according to the invention, the guide provided with the curved rail is positioned vertically between the entrance and the exit of the twist, its upstream portion located in alignment with the upstream portion of the straight rail and its downstream portion is located transversally on the same level as the downstream portion of said straight rail.

According to another arrangement of the invention, the guide provided with the curved rail comprises, at its upstream portion, means providing for its fixing to the frame, said means make it possible to adjust its position in alignment with the entrance of the straight rail.

Still according to the invention, the guide provided with the curved rail comprises also, at its downstream portion, means providing for its fixing to the frame, said means make it possible to adjust its transversal position to the horizontal of the exit of the straight rail.

According to another arrangement of the invention, the curved rail comprises, according to the forms and dimensions of the preforms to be conveyed, a profile which is adapted to the new separation to be taken into account, and the straight rail remains unchanged.

Still according to the invention, the rails are formed in the shape of a half-round in order to guide the preforms and avoid damaging them when they slide above with a simultaneous progression and tipping movement.

BRIEF DESCRIPTION OF THE DRAWINGS

But the invention shall be further detailed using the following description and annexed drawings, provided by way of example and wherein:

FIG. 1 is a diagrammatical stripped view of the conveyor device in the form of a twist according to the invention, able to guide preforms, FIG. 2 is a diagrammatical view of the upstream end of the twist, FIG. 3 is a diagrammatical view of the downstream end of the twist.

DETAILED DESCRIPTION OF THE INVENTION

Such as is shown in FIG. 1, the conveyor device 1 makes it possible to conjugate a longitudinal movement of the preforms 2 and a pivoting movement of the latter around the longitudinal axis 3 of displacement.

This type of device 1 is inserted into a line for conveying preforms 2 when it is necessary to modify their orientation, regardless of the initial orientation of these preforms.

In the example, shown FIG. 1, the preforms 2 switch from the horizontal position, at the entrance 4 of the device 1, to a vertical position at its exit 5.

These preforms 2 generally have a tubular body 6 closed at one end and the other end comprises, for example, a tip 7 with a threading, said tip is delimited in relation to said body 6 with a collar 8.

During their conveyance, the preforms 2 benefit from a guidance on the portion of the body 6 which is located under the collar 8, in cooperation with the latter, and this guidance is commonly referred to as: guidance under the neck.

This guidance, in order to be complete and effective, is carried out, on the one hand, using two rails 12 and 13 that perform this guidance under the neck and, on the other hand, according to the case, using a complementary rail 14, which is shown in FIGS. 2 and 3. This rail 14, detailed further on, extends between the entrance 4 and the end 5 and it is formed in order to shape, with the rails 12 and 13, a kind of tunnel wherein is imprisoned the open end of the preforms 2.

This conveyor device 1, according to the invention, has the particularity of comprising, between the entrance 4 and the exit 5, on the one hand, a rail 12 which is straight and, on the other hand, a rail 13 which is curved.

This curved rail 13 has a curvature and a position in relation to the straight rail 12 which makes it possible to establish between the two, a distance D which is suitable for carrying out the guidance of the preforms 2 and this distance D is constant along the entire length of the guidance path of said preforms 2.

The entrance 134 of the curved rail 13 is located in alignment with the entrance 124 of the straight rail 12.

Moreover, the exit 135 of the curved rail 13 is located laterally, or transversally, on the same level as the exit 125 of the straight rail 12.

According to the embodiment detailed in the various figures, the rails 12 and 13 correspond to the respective edges of two guides marked 15 and 16 in the form of simple flats.

Indeed the straight rail 12 is one of the edges of a guide 15 which is arranged horizontally; the rail 13 is an edge also of the guide 16 which is arranged vertically but this edge is formed suitably in order to allow for the establishment of a constant distance D between the two rails, said distance D is substantially greater at the diameter of the body 6 of the preform 2, under the collar 8.

The edges of rails 12 and 13 are formed in half-rounds using a forming tool. The preforms 2 are guided on the rails 12 and 13 and they slide by tipping on the half-round edges, with no risk of damage.

The guide 15 is attached to the frame 17 of the conveyor device 1, FIGS. 2 and 3, by suitable means and its position can be invariable. It can indeed be used as a guide for all types of preforms 2.

On the other hand, the guide 16 is also attached to the frame 17 but its position is variable according to the type and in particular to the diameter of the body 6 of the preforms 2. This guide 16 comprises, at its upstream portion, means for fixing 18 which, in cooperation with the frame 17, make it possible to adjust its position in alignment with the entrance 124 of the rail 12. Likewise, at its downstream portion, it comprises means for fixing 19 which make it possible to adjust its transversal distance in relation to the horizontal of the exit 125 of the rail 12.

The rail 14 is also attached to the frame 17 of the conveyor device 1 by means of arms 20 of which the length and the form are suitable according to their positions on said device. This rail 14 is formed to shape, with the two other rails 12 and 13, a kind of tunnel wherein is guided and imprisoned the end of the preforms 2.

The arms 20 can be adjustable and/or deformable, for example, in order to easily adapt the position of the rail 14 to the dimensions of the preforms 2 and position it approximately in the median portion of the neck 21.

The invention claim is:

1. A conveyor device for products of the preform type, of the type forming a kind of tunnel wherein is guided and imprisoned the end of said preforms, on the neck side, said tunnel is comprised of several rails supported by a frame and formed to shape a twist which extends from an entrance to an exit of said tunnel, said several rails comprising:
a rod which cooperates with the end of the preforms, on the neck side, in order to retain the preforms, said rod extending along a twisted path;
a first rail and a second rail which provide a guidance under the neck of said preforms: said first rail is a straight rail and said second rail is a curved rail, said curved rail is formed with a profile configured to establish constant separation between said first rail and said second rail from said entrance and said exit of the twist;
wherein the curved rail corresponds to an edge of a first flat planar structure, the edge of the first flat planar structure formed with a curvature so as to form the constant separation with the straight rail between the entrance and the exit of said tunnel;
wherein the curved rail is positioned vertically between the entrance and the exit of the twist, an upstream portion of the curved rail is located in alignment with an upstream portion of the straight rail and a downstream portion of the curved rail is located at a same level as a downstream portion of said straight rail.

2. The conveyor device according to claim 1, wherein the straight rail corresponds to an edge of a second flat planar structure.

3. The conveyor device according to claim 2, wherein the straight rail is positioned horizontally between the entrance and the exit of the twist.

4. The conveyor device according to claim 1, wherein the curved rail is fixed to the frame at the upstream portion of the curved rail so that a separation between the curved rail and the straight rail at the entrance of the twist is adjustable.

5. The conveyor device according to claim 1, wherein the curved rail is fixed to the frame at the downstream portion of the curved rail so that a separation between the curved rail and the straight rail at the exist of the twist is adjustable.

6. The conveyor device according to claim 1, comprising, according to the forms and dimensions of the preforms to be conveyed, a curved rail of which the profile is adapted to the new separation to be taken into account between the curved rails and the straight rail.

7. The conveyor device according to claim 1, wherein the curved rail and the straight rail are formed in half-rounds in order to prevent damaging the preforms.

8. A conveyor device for changing an orientation of an object as the object is guided downstream, comprising:
an inlet;
an outlet;
a guide that extends between the inlet and the outlet along a curved path and configured to engage and retain an end of the object as the object is conveyed;
a first rail defining a first edge that is straight, the first edge configured to engage a part of the object, the first edge extending between the inlet and the outlet and contained within a first plane; and
a second rail formed by a first planar structure and defining a second edge that is curved for at least a portion of a length of the second edge, the second edge configured to engage another part of the object, the second edge extending between the inlet and the outlet and contained within a second plane;
wherein the first edge and the second edge form a constant separation between the inlet and the outlet; and
wherein the first planar structure is vertically oriented between the inlet and the outlet, an upstream portion of the second rail is located in alignment with an upstream portion of the first rail and a downstream portion of the second rail is located at a same level as a downstream portion of the first rail.

9. The conveyor device of claim 8, wherein the object is a perform with a neck and flange.

10. The conveyor device of claim 9, comprising the perform supported by the first edge and the second edge and engaged at one end with the guide.

11. The conveyor device of claim 8, wherein the guide is a rod.

12. The conveyor device of claim 8, wherein the first edge is an edge of a first plate and the second edge is an edge of a second plate.

* * * * *